(12) United States Patent
Weschler (10) Patent No.: US 6,807,181 B1
(45) Date of Patent: Oct. 19, 2004

(54) CONTEXT BASED CONTROL DATA

(75) Inventor: Paul Weschler, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,804

(22) Filed: May 19, 1999

(51) Int. Cl.$^7$ .............................. G06F 15/16; G06F 3/00
(52) U.S. Cl. ....................... 370/400; 370/901; 709/203; 719/315; 713/182
(58) Field of Search ................................ 370/400, 401, 370/901, 908; 709/200, 201, 202, 203, 227, 228, 229; 719/315, 316; 713/182, 200

(56) References Cited

U.S. PATENT DOCUMENTS

| | | | |
|---|---|---|---|
| 5,440,744 A | * | 8/1995 | Jacobson et al. ........... 709/203 |
| 5,619,710 A | * | 4/1997 | Travis et al. ................ 709/203 |
| 5,832,506 A | | 11/1998 | Kuzma |
| 6,754,826 B1 | * | 6/2004 | Challener et al. ........... 713/182 |

OTHER PUBLICATIONS

Article Lightweight Directory Access Protocol (v3), by M. Wahl et al., Dec. 1997.
Article "Lightweight Directory Access Protocol (v3) Extensions for Dynamic Directory Services" By Y. Yaacovi et al., May 1999.

* cited by examiner

Primary Examiner—William Luther
(74) Attorney, Agent, or Firm—Stuart T. Langley; William J. Kubida; Hogan & Hartson LLP (57) ABSTRACT

A method, system, and computer program product for accessing server resources by a client communicating control data to a server. A context object is associated to the control data. The context object includes methods for recording within the context object a set of properties identifying the client. A request packet is created from the control data and the context object. The request packet is transmitted to the server. The context object is passed to at least one method on the server. The method uses the context object to access the server resources.

47 Claims, 7 Drawing Sheets

CONTEXT BASED CONTROL DATA

BACKGROUND OF THE INVENTION

1. Field of the Invention

The present invention relates, in general, to enterprise computing systems and methods, and, more particularly, to a method and system which provides secure client/server interactions in a distributed computing environment.

2. Relevant Background

Computer systems including business systems, entertainment systems, and personal communication systems are increasingly implemented as distributed software systems. These systems are alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network (LAN). In such systems powerful server computers (e.g., application servers and file servers) are used to process and access data. The requested data is then transmitted to the client computer for further processing. To scale to larger networks, multiple LANs may be internetworked using, for example, leased data lines to create a wide area network (WAN). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

Moreover, conventional network solutions do not scale well because as the network becomes larger, it becomes increasingly difficult to identify and locate resources needed by the various network clients. Enterprise networks typically utilize directory and meta-directory services to maintain resources. Directories are data structures that hold information such as mail address book information, printer locations, public key infrastructure (PKI) information, and the like. Because of the range of functions and different needs of driving applications, most organizations end up with many different, disparate directories. Each directory mechanism and each type of information maintained by a directory may require different information from the user in order to operate effectively. For example, a name and address directory may only require the user's ID to verify access permissions for read operations, but may require authentication information, such as a signature, for write/modify operations. As the number and variety of directories increases, it becomes increasingly difficult to manage these varying demands.

Meta-directories are a solution that provides directory integration to unify and centrally manage disparate directories within an enterprise. A meta-directory product is intended to provide seamless integration of the multiple disparate directories. However, because meta-directories involve a wider range of data types than individual directory mechanisms, the difficulty in managing user-specific information required by the individual directories is even more complex. Also, a meta-directory product must be aware of the user information required by each of the data structures that is supposed to integrate. This required knowledge makes meta-directories difficult to maintain in a computing environment that is rapidly changing. As a result, meta-directory solutions are not sufficiently extensible to account for the wide variety of resources available on a distributed network. In the past, meta-directory technology has not been used to catalog meta-data of sufficiently general nature to meet the needs of a dynamically growing and changing distributed computing environment.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured e-mail application to access e-mail while working from a workstation but prefer a more compact application to access the same data when using a handheld computer or cellular phone. In each case, the network desirably adapts to the changed conditions with minimal user intervention.

In order to support mobile users, a conventional network had to provide a gateway for remote access. Typically this was provided by a remote access server coupled to a modem. Remote users would dial up the modem, comply with authorization and/or authentication procedures enforced by the server, then gain access to the network. In operation the mobile user's machine becomes like a "dumb terminal" that displays information provided to it over the dial-up connection, but does not itself process data. For example, a word processing program is actually executing on the remote access server, and the remote user's machine merely displays a copy of the graphical user interface to the remote user. A remote user would establish a session, perhaps a secure session if authorization and authentication procedures were used, and all communication after session establishment would be considered authentic. Both the client and server had to maintain state information to track the session state. The reliance on state information and session methodology remains difficult to implement on insecure, "best efforts" type networks such as the Internet. A "best efforts" type network is one in which data packets may be dropped if they are undeliverable. When packets can be lost, state synchronization is interrupted and non-recoverable errors may result in transaction processing.

There is increasing interest in remote access systems that enable a user to access a LAN/WAN using public, generally insecure, "best efforts" type communication channels such as the Internet. Further, there is interest in enabling LANs to be internetworked using public communication channels. This is desirable because the network administrator can provide a single high speed gateway to the Internet rather than a remote server/modem combination for each user and expensive WAN communication lines. The Internet gateway can use leased lines to access the Internet rather than more costly business phone lines. Also, the Internet gateway can be shared among a variety of applications and so the cost is not dedicated solely to providing remote access or wide area networking. The reduction in hardware cost and recurrent phone line charges would be significant if remote users could access the LAN/WAN in this manner.

As used herein, the term "control data" refers to any data associated with a client request that is used to effect the response as distinguished from the actual request or response data. Systems which permit access of their internal network from a remote site through outside unsecured network connections like the Internet greatly increase the risk of an unauthorized network intrusion. A network intruder may potentially read, modify, or destroy sensitive or valuable information. One common method of limiting network access to only trusted remote users is by password authorization. In order to gain access to the internal network, a remote user is required to enter a password corresponding to a login name. Third parties not privy to the login name and password are blocked from accessing the network.

Although password protection offers some amount of network security, it is vulnerable to packet sniffing and hijacking attacks. Packet sniffers are software applications that analyze network packets traveling over a network node. Attackers can use sniffers to read passwords and data transferred across an unsecured network. This information can then be used to gain access into the internal network. Hijacking generally involves taking over a remote network connection after a trusted user has completed the password authorization process. Once a connection is hijacked, the attacker may have access to the internal network with the same privileges of the trusted user.

Another known method of preventing unauthorized remote access into an internal network is by packet filtering. In this method, a screening router only allows internal network access from trusted IP addresses or ports. Network packets received from unknown IP addresses are blocked, denying the unknown client network access. Security systems based on packet filtering techniques are generally susceptible to IP spoofing attacks. In such attacks, intruders create packets with falsified source IP addresses of trusted locations, thereby gaining access to the targeted system disguised as a trusted user. Moreover, such systems limit the network's flexibility in allowing users to access network resources from any available port.

Data encryption may also help defend network systems for intruders. Encryption algorithms generally scramble messages and render them meaningless to anyone who does not have an unscrambling cryptographic key. In a private key encryption system, the same key is used to encrypt and decrypt messages. To communicate using a private key system, the both parties must know the key used. Furthermore, the key must be communicated between the parties securely, without third parties finding out what key is used. One drawback of private key systems is that there is a greater likelihood that the private key will fall into the wrong hands as more users require knowledge of the key. Thus, private key encryption systems are generally impractical for a networks with a large number of users.

Public key encryption methods employ a two key system, a public key and a private key, to secure messages. Each key has the ability to decrypt the other key's encrypted messages, but cannot be used to decrypt its own encrypted messages. For example, a message encrypted by the public key can only be decrypted by its corresponding private key. Moreover, a message encrypted by the private key can only be decrypted using the public key. To use a public key encryption system, the message recipient passes one key (the public key) to whomever wishes to send it a secure message. The message recipient keeps the other key (the private key) secret and uses it to decrypt the sender's message. Anyone eavesdropping on the conversation between the recipient and sender can only learn the public key, and is therefore unable to decrypt the message.

While a public key encryption system helps conceal and authenticate data transferred across an open network, it is generally difficult to coordinate in advance. Typically, the parties must agree beforehand on the encryption and hashing algorithms to be implemented. The parties must also exchange public and perhaps even private keys before any messages are sent. In addition, applications transferring data between the remote and local hosts must be modified to understand the encryption system used. What is needed is a secure network environment for transferring data and commands over an public network that readily adapts to a changing, heterogeneous needs of a distributed network computing environment.

SUMMARY OF THE INVENTION

Briefly stated, the present invention involves a method for accessing server resources by a client communicating control data to a server. The method includes the step of associating a context object with the control data. A recording step records a set of properties identifying the client in the context object, and a creating step creates a request packet from the control data and the context object. A transmitting step transmits the request packet to the server. The context object is passed to at least one method at the server in a passing step, and the context object is used within the method in a using step. An accessing step accesses the server resources by the method.

The using step of the method may further include a step for determining an identity of the client from the context object. This determining step may include a step for authenticating the identity of the client. The accessing step may be based on the identity of the client. The using step may also include determining a client privilege from the context object. In addition, the accessing step may be based on the client privilege.

The method of can further include steps for hashing the context object to produce a digest number, and recording the digest number in the context object. The digest number may be encrypted with a client private key in an encrypting step. Likewise, the method may include steps for hashing the control data to produce a digest number, and recording the digest number in the context object. The method may also include a step for encrypting the context object with a server public key.

The present invention also relates to a system for implementing commands over a network. The system includes a server executing a service program and a client connected to the server over the network. A request packet issued by the client to the server includes at least one command request. Additionally, at least one context object is associated to the command request within the request packet. The system includes a plurality of methods associated with the service program which perform the command request based on the context object.

The context object may further include a plurality of methods to record a set of client identifying properties in the context object. For example, the set of identifying properties may include a client entity type, a client entity identification, and a client group identification. Additionally, the context object may include a method for creating a digest number by hashing the client identifying properties, and a method for recording the digest number. A method for encrypting the digest number with a client private key may also be included in the context object.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

It is contemplated that the present invention will be particularly useful in environments that require a data structure suited to store a variety of data types where data operations are performed differently depending on user supplied context information. Also, the system of the preferred implementation is optimized to store and make available relatively compact units of data that serve to configure devices and computer environments rather than operational or analytical data upon which the computer environment may operate at runtime. However, the invention is also useful in managing data structures that store even a single type of data where control over data operations is desired without a need to maintain state or session information between a client and server.

To aid understanding the specific embodiments described herein, several words and terms used herein to describe the present invention are defined below:

Attribute—The combination of a key related to one or more values. Frequently described as a key=value pair.

Context—An object or reference to an object containing data used to authenticate and authorize client control data sent to a server.

Binding—A special type of attribute where the value of the key=value pair is itself a Profile. Binding one Profile to another in a chained fashion it is possible build tree structures of related profiles and attribute information (called a profile tree).

Meta-data—Special data attributes used by a profile service to help maintain and manage profiles and user data within the profiles.

Profile—A collection of attributes related either directly or indirectly to a EntityProfile that contains data or links to data used by an entity.

EntityProfile—A collection of attributes that establish the root of a profile tree and serve as the base representation of some entity. This is the core data object around which the entire Profile Service is designed to function. In an object oriented sense an EntityProfile extends a Profile to add special functions and behavior.

ProfileList—A special type of Profile whose member attributes (with the exception of some system attributes) are themselves Profiles. In an object oriented sense a ProfileList extends a Profile to add special functions & behavior.

Profile Service—The term generally used to refer to all of the functional interfaces of Profile Service and/or an implementation of. The term is frequently used to refer specifically to the core Profile Service interface.

Profile Service Interface—The core functional interface of the Profile Service. This interface provides functions for creating, searching and removing profiles in addition to some administrative utilities.

Profile Interfaces—A term used to collectively refer to the functional interfaces of Profile, EntityProfiles and ProfileLists. These interfaces provide functions for manipulating the composition of individual Profiles.

Resource ID—An identifier that is constructed by the Profile Service to uniquely identify every constituent profile and attribute therein. Resource IDs have a well defined string structure.

Profile Type—A special attribute of all Profiles. This attribute is mandatory for all profiles and plays an important role in generating resource IDs and data indexing.

Entity-Entity ID—A special attribute of all EntityProfiles. This attribute plays an important role in generating resource IDs and data indexing. The Profile Service enforces the rule that all entity IDs are unique within the set of all EntityProfiles of the same type.

List Key—A special attribute of all ProfileLists. This attribute plays an important role in generating resource IDs and data indexing. The Profile Service enforces the rule that all profiles bound to a ProfileList are bound to the key such that that the ProfileLists may only have one member Profile with a specific list key value.

List Members—A term used to refer to the collection of Profiles bound to a ProfileList. Each bound profile is referred to as a member.

Figure 1:
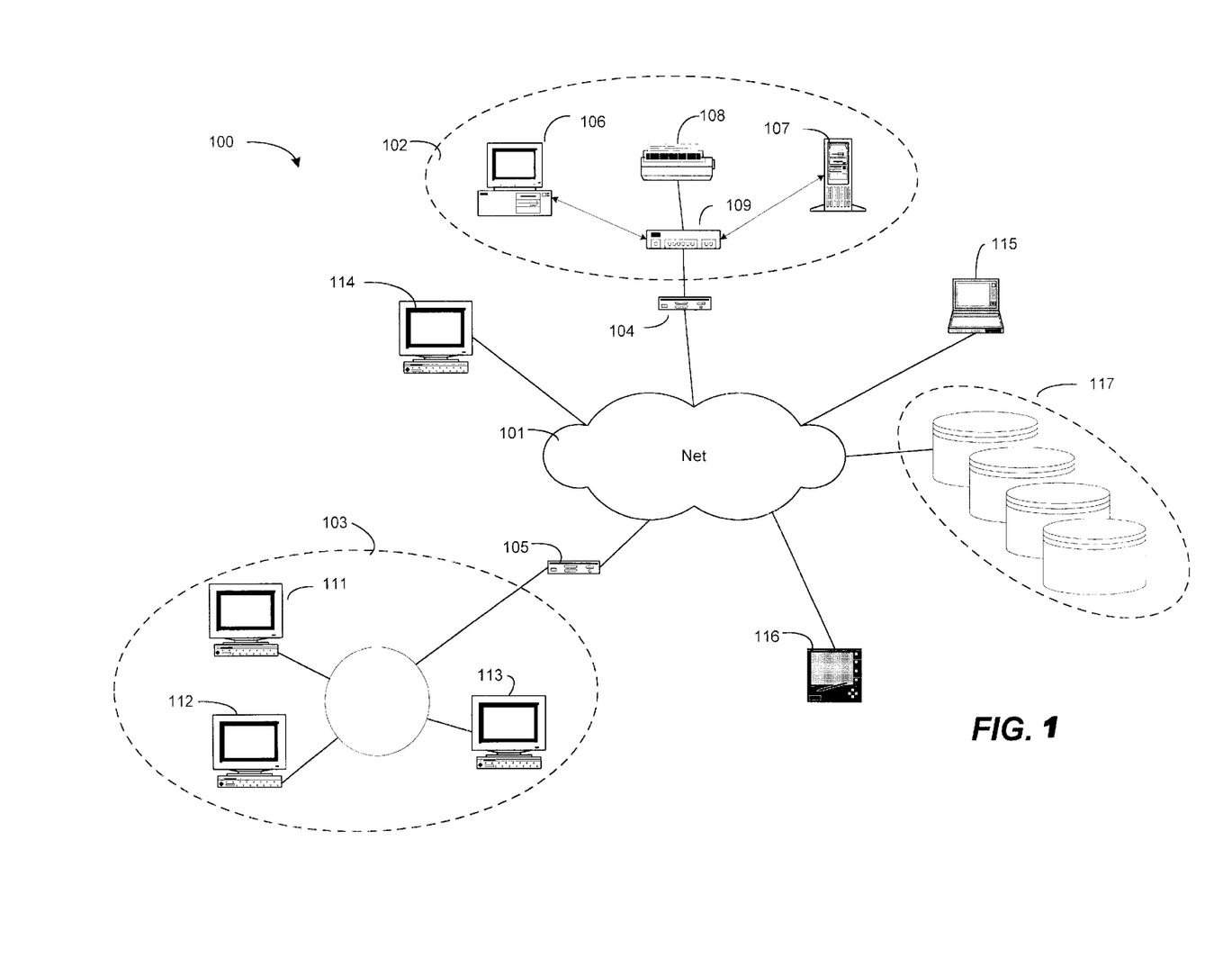
FIG. 1 illustrates an exemplary network computing environment in which the present invention is implemented.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the Internet or another network mechanism such as a fibre channel fabric or conventional WAN technologies.

LAN 102 includes one or more workstations such as personal computer (PC) 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 117 that provides mass storage capacity beyond what an individual device can efficiently use and manage. Selected components of the present invention may be stored in or implemented in shared mass storage such as disk farm 117.

The computer program product devices in accordance with the present invention include elements that operate in a server such as a server 106, a client such as a workstation 111, or both. It is contemplated that elements may be stored remotely, delivered to a client system on demand by a server computer, and executed partially or completely by the server and client. Accordingly, the present invention is not limited by the methods of distribution or packaging that a particular application involves. In other words, the present invention may be distributed client-only software devices, server-only devices, or as system software that is distributed to both client and server devices.

Figure 2:
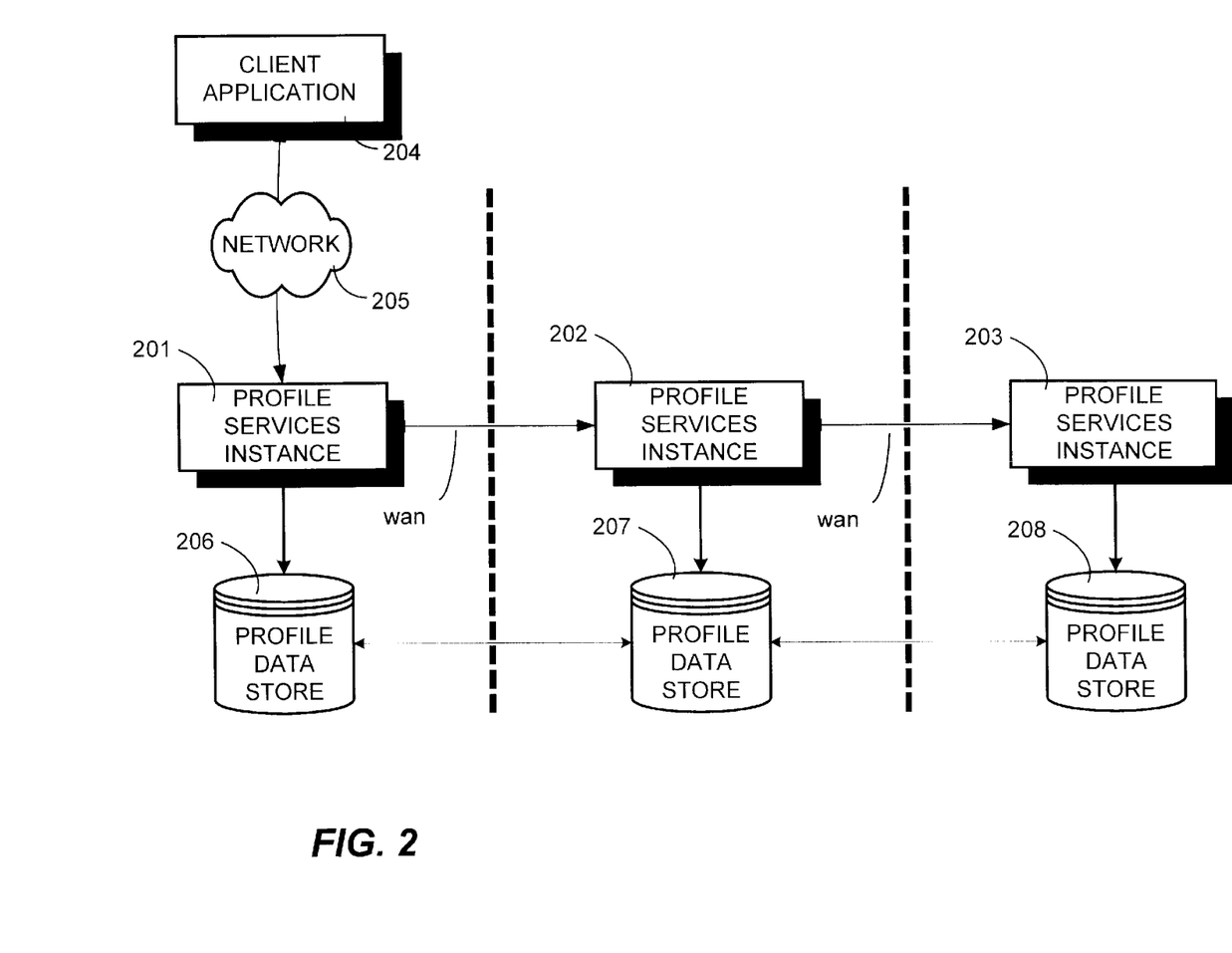
FIG. 2 shows a more specific network architecture in which in which the present invention is employed in a simple form.

FIG. 2 shows a generalized diagram of a distributed computing environment implementing the profile services in accordance with the present invention. The environment of FIG. 2 includes a profile services application 201 and a client application 202 connected over a network 203. The network 203 is representative of a variety of communication channels, including a public network such as the Internet. The profile services application 201 may also be connected to a local data store 204 and/or a remote data store 205. Data stores 204 and 205 contain profile data and are described in more detail below.

The client application 202 typically sends control data through the network 203 requesting some form of access to profile data. For example, the client application 202 may want to read, write, or modify the profile data. Along with control data, the client application 202 sends context data. Context data is used by the profile services application 201 to authenticate the client and determine whether the client has profile data access rights.

Optionally, the profile services application 201 may interact with other auxiliary services 206 and remote services 207. Examples of such services include an authorization service that supports enterprise level access control enforcement by authorizing and authenticating user entities. Another example is a group service that provides a mechanism for defining and maintaining group entity profiles. This enables the profile service to dynamically integrate functionality as new services and software applications become available that can communicate with the provided optional interface.

Figure 3:
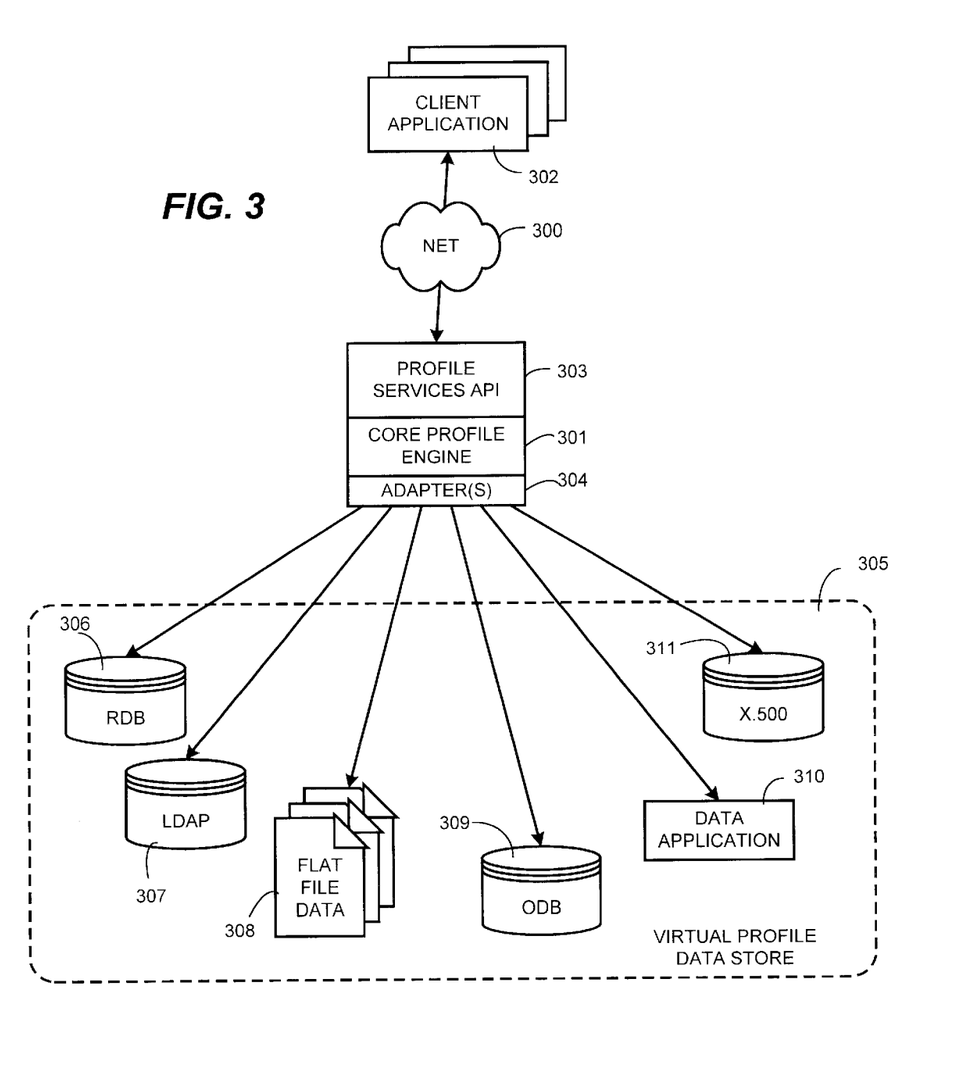
FIG. 3 shows in block diagram form significant components in a particular example of a profile service mechanism in accordance with the present invention.

FIG. 3 shows a more specific example of an implementation of the present invention. The present invention includes a core profile engine 301 that is accessed by a client application 302 through a network 300. A profile services application programming interface (API) 303 provides an interface that enables client applications 302 that have a corresponding interface to send and receive messages. The messages, typically containing control and context data, enable the client application 302 to request profile services from core profile engine 301.

In a particular embodiment, the profile services API 303 implements a protocol based on XML (extensible Markup Language) embedded within HTTP (HyperText Transfer Protocol) packets. The XML messages have embedded elements that contain formatted data and commands, along with context information for requests communicated between the client application(s) 302 and the core profile engine 301. XML messages are a useful format because they provide a standard grammar that is well understood. Moreover, the XML language is extensible, actively developed, and readily transportable through a variety of communications media using commonly available HTTP transport mechanisms. Routers, switches, network ports, and other network devices handle HTTP formatted messages and are configured to handle them appropriately and reliably. It is contemplated that other formats and transport mechanisms may be useful in particular applications such as transport mechanisms specified for fibre channel fabrics as well as proprietary transport protocols. These and other implementations are considered equivalent to the specific embodiments disclosed herein unless specifically indicated otherwise.

The core profile engine 301 maintains a set of meta-data attributes associated with every true-data attribute. For clarity, a true-data attribute is defined herein as data that contains a value (e.g. data, external reference, or binding) used by the client application 302. A meta-data attribute is defined as data associated with a true-data attribute which contains information used and maintained by the core profile engine 301. Meta-data attributes may also contain information associated with an entire profile, rather than an particular true-data attribute. Meta-data attributes control how the profile engine 301 makes the profile data available to client applications 302. Meta-data attributes include, but are not limited to, information regarding owner identity, read-write-modify permissions, group membership, timestamps, triggers, and the like.

The core profile engine 301 responds to the client application requests by executing requested functions on virtual profile data store 305. Virtual profile data store 305 may comprise a single data storage device, but more often comprises a plurality of disparate, heterogeneous data storage devices. The specific example of FIG. 1 includes a relational database 306, lightweight directory access protocol 307, flat data file 308, object oriented database 309, and X.500 directory 311. An adapter 304 may also access another data application 310 where the data application 301 provides an API compatible with the adapter 304 and operates to access other local and distributed data stores. In a particular implementation, adapter(s) 304 comprise an adapter for each data store device and/or protocol. Each adapter 304 includes an interface to core profile engine 301 and a special purpose interface configured to the specific data store within virtual data store 305 that it is intended to access. Virtual data store 305 includes a dynamically changing number of data store devices as devices can be added, changed, and deleted by modifications to the associated adapter 304.

Figure 4A:
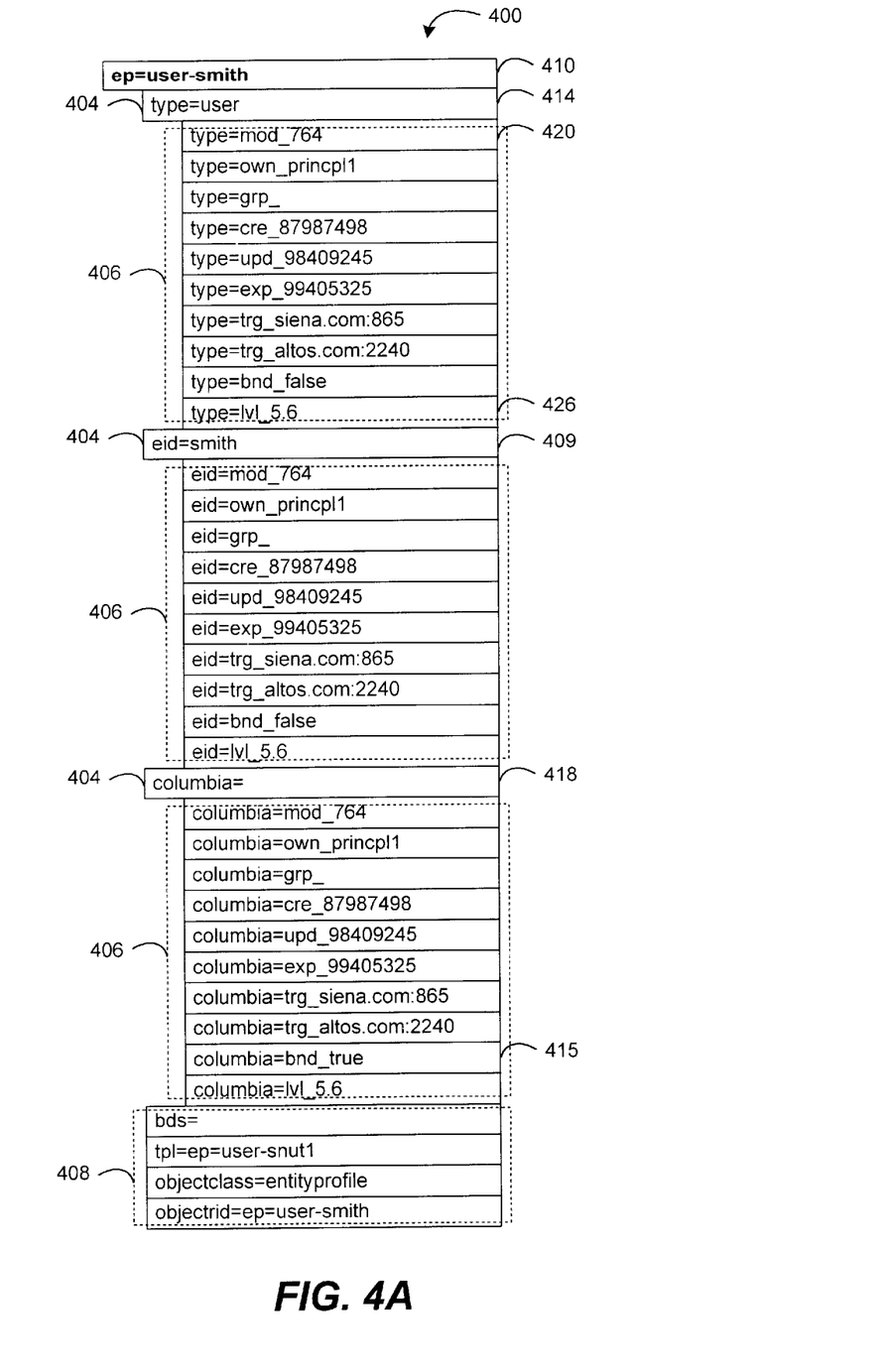
FIG. 4A and FIG. 4B show a representation of exemplary profile objects in accordance with the present invention.
Figure 4B:
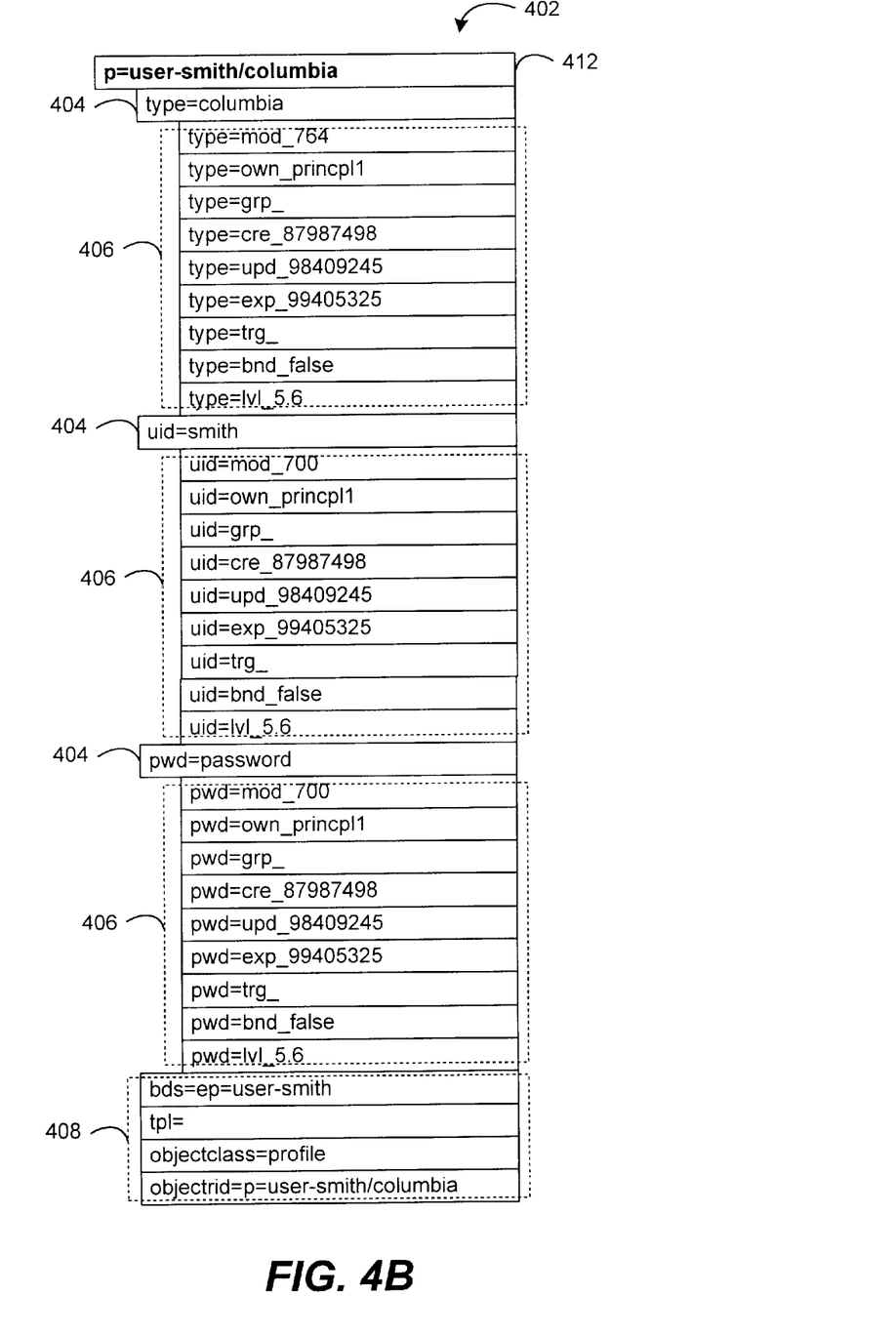

FIG. 4A and FIG. 4B show a representation of two exemplary profile objects of the present invention; an "entity profile" 400 and a "subprofile" 402. As used herein, a "profile" is a group or set of key=value pairs, where each key/value pair is referred to as an "attribute". Both the entity profile 400 and the subprofile 402 include true-data attributes 404 and associated meta-data attributes 406. In addition, both profiles 400 and 402 contain meta-data attributes 408 associated with each profile, and not with any particular true-data attribute. The value associated with a given key may be either a primitive value (e.g., a numeric value, string value, logical value, and the like) or may be another profile. When the value is another profile the value is referred to as a "binding". By binding several profiles it is possible to build hierarchical trees of information. It is possible to bind a profile to multiple parent profiles which is referred to herein as "linking". Linking enables the representation of relational information by creating a DAG (Directional Asyclical Graph) in addition to hierarchical information.

As used herein, the term "object" refers to a data structure stored in mass storage or memory accessible by a computer that contains specified data and a set of methods or operations that enable the object to perform operations on the data it contains. The methods contained in an object also implement an interface enabling the object to receive data from and send data to other computer program devices. It should be understood that the physical implementation of profile objects 400 and 402 may vary significantly from application to application and may be implemented as a contiguous segment of storage locations or a dispersed arrangement of physical locations that are logically ordered in a manner shown in FIG. 4A and FIG. 4B.

In general, when a profile is created it must be the "child" or subprofile of some other profile, or it must be an entity profile. An entity profile, such as shown in FIG. 4A, is a special subclass of a profile object that has an additional unique fixed attribute 409 called an entity ID. Entity profiles are used to represent data that has no single child relationship to another profile, or when no other profile exists. In contrast, conventional profiles (i.e., non-entity profiles) must always be attached as a child to either an entity profile or another non-entity profile. Essentially, entity profiles serve a special role of establishing roots from which other profiles may be attached. Entity profiles support all of the operations of a profile, but add additional support for accessing the entity ID attribute.

Another special profile type is called a "profilelist". A profilelist relates multiple profiles of the same type to a single parent. This is done by binding a single profile list to a parent with multiple member subprofiles added to the list. While profilelists serve to collect profiles of the same type, it is contemplated that they may also be used as a convenient collection object for subprofiles of different types.

The profile service in accordance with the present invention provides a high-speed mechanism to lookup, structure, and store data attributes. The present invention is preferably implemented as a service running on a gateway server or distributed network. The present invention is intended to integrate several physical data stores into a single, distributed logical data store of reference information.

The entity profile 400 has a profile name 410 of "user-smith" and the subprofile 402 has a profile name 412 of "user-smith/columbia". Each true-data attribute 404 contains a key=value pair holding information used by an entity. Each meta-data attribute 406 with the same key as a true-data attribute 404 is associated to the true-data attribute 404 and is typically created at the time the true-data attribute 404 is created. For example, in FIG. 4A, every meta-data attribute 406 with the key "type" is associated to the true-data attribute 414 "type=user". Associated meta-data attributes 406 contain information telling the profile engine how to control the true-data attribute 404. Other meta-data attributes 408 not associated to any true-data attribute contain profile level information.

The structure of meta-data attributes is the same as the structure of true-data attributes. Each meta-data attribute contains a key=value pair. The type of information contained within a meta-data attribute 406 is identified by a known value prefix in the key=value pair. For example, the entity profile 400 contains a meta-data attribute 415 "columbia= bnd__true" associated to a true-data attribute 418 "columbia=". Since the prefix "bnd__" of the meta-data attribute 415 is set to "true", the associated true-data attribute 418 is identified as a binding to a subprofile 402, such as shown in FIG. 4B.

The mode meta-data attribute 420 (mod__) provides a data level access control mechanism and in a particular example is analogous to the Solaris™ or Unix file permissions. Solaris is a trademark or registered trademark of Sun Microsystems, Inc. in the United States and other countries. For example, in the mode meta-data field the first digit after the mod__ prefix indicates owner privileges, the second digit indicates group privileges, and the third digit represent world privileges. Each digit are allowed to have a value that is any combination (e.g., sum) of read(4), write(2), execute (1) and none(0) following Unix file permission methodology. A value of "7" indicates read, write, and execute privileges whereas a value of "4" indicates read only, a value of 3 indicates write and execute only, and the like. This encoding mechanism is provided by way of example only and other equivalent permission encoding schemes may be equivalently substituted to meet the needs of the profile service environment. In this manner the meta-data storage feature described hereinbefore enables an owner and group membership to be specified for every attribute and binding within a profile. Access permissions can be specified on an attribute and binding basis for the specified owner, group and world. This feature of the present invention provides a powerful tool for both sharing information within a profile while controlling the information that is shared with other systems and users.

The present invention may also support meta-data assurance level values set by an authorization service module. The assurance level can be an arbitrary floating point scale set by the authorization service to denote the confidence level that an entity is actually who it says it is. In this manner, profile access privileges can be limited to entities that return an assurance level equal to or greater than the recorded profile meta-data assurance level. In FIG. 4A, meta-data attribute 426 associates an assurance level of 5.6 to the true-data attribute 414.

Figures 5A, 5B:
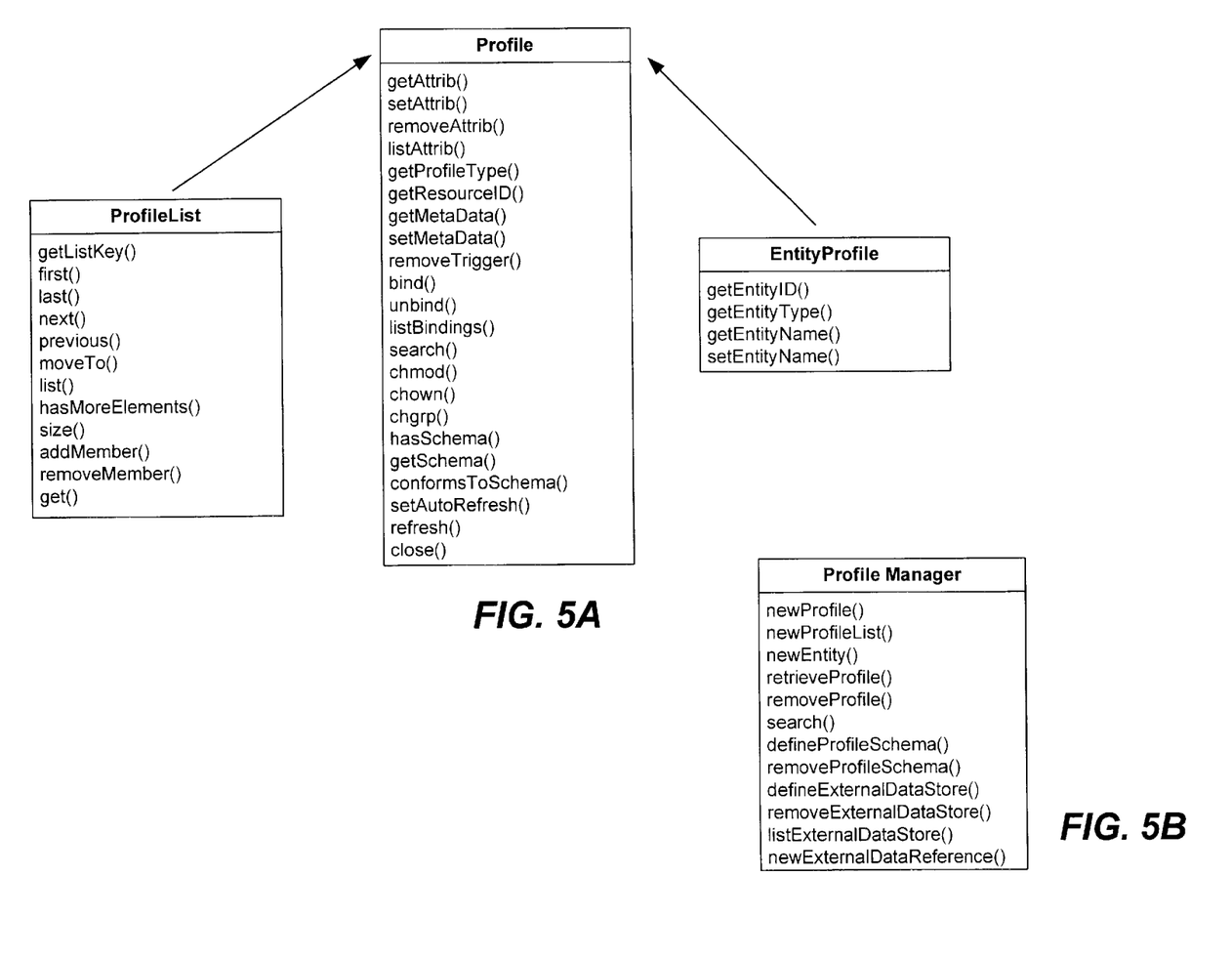
FIG. 5A and FIG. 5B show class structures and relationships between classes used in an exemplary embodiment of the present invention.

FIG. 5A and FIG. 5B illustrate simplified class diagrams indicating basic functional objects and characteristics of a profile service in accordance with the present invention. The profile service supports two basic functional objects, profiles themselves and a "profile manager". The profile manger interface is alternatively referred to as the profile service interface. The logical interfaces shown in FIG. 5A and FIG. 5B are not intended to be literal. Instead they are intended to articulate the fundamental functional operations that the service supports. All implementation of the profile service desirably support these classes of functions. In addition, individual implementations may support additional methods that are not supported in all implementations to meet the needs of a particular application.

A profile class includes variables, data and methods necessary to define basic functional interfaces of general profiles. In particular, profile class methods include a method for retrieving and creating true-data attribute information (getAttrib and setAttrib). The profile class also includes a method for looking at the contents of meta-data attributes (getMetaData), a method for creating meta-data attributes (setMetaData), a method for removing a trigger value (removeTrigger), a method for creating a subprofile binding (bind), a method for removing a binding (unbind), a method for changing attribute access privileges (chmod), methods to change an attribute's owner and group (chown and chgrp), and methods of checking a profile's template settings (hasSchema, getschema, and conformsToSchema). The basic operation of some of the profile class methods is summarized in Table 1.

TABLE 1

| Method | Operation Summary |
| --- | --- |
| getAttrib | Given a true-data attribute key, the getAttrib method will return the value of the true-data attribute. |
| setAttrib | Given a true-data attribute key and an attribute value the setAttrib method sets an attribute on a profile, where key=value. |
| removeAttrib | Given a true-data attribute key and value, removes a specified attribute value from a profile. If no attribute value is set, the entire attribute is removed. An entity must have execute privilege to perform this operation. |
| listAttrib | Returns a list of true-data attributes which exist on a profile. |
| getProfileType | Returns a profile's object class type. |
| getResourceID | Returns a profile's resource ID value. |
| getMetaData | Given a meta-data attribute key and a value prefix index, returns the value of the meta-data attribute. |
| setMetaData | Given a meta-data attribute key and value, sets the attribute on the profile where key=value. |
| removeTrigger | Removes a specified trigger from a profile's trigger meta-data attribute. |
| bind | Established a parent child relationship between a first profile and a second profile (the child). Essentially, an |

TABLE 1-continued

| Method | Operation Summary |
| --- | --- |
| | attribute is established in the first profile pointing a subprofile. |
| unbind | Causes a profile binding to be removed. |
| listBindings | Lists the profiles bound to a profile. |
| search | Returns all the true-data attributes that match specified filters relative to a profile. |
| chmod | Given a true-data attribute key, changes the attribute's access privileges. In order to execute this method, the caller must have execute privilege on the attribute. |
| chown | Changes the owner of a true-data attribute. In order to execute this method, the caller must be the current owner of this attribute and have execute privilege. |
| chgrp | Changes the group of a true-data attribute. In order to execute this method, the caller must be the attribute's current owner or a member of its group and have execute privilege. |
| hasSchema | Determines if a profile is associated to one or more templates. |
| getSchema | Returns a profile template's required attributes. |
| conformsToSchema | Returns a true or false depending on whether or not a profile conforms to its templates. |
| setAutoRefresh | Sets the automatic refresh state of a profile. Automatic refreshing of a profile causes the profile to be synchronized with all other instances of the profile. This feature ensures that users are immediately seeing the changes made by other users. |
| refresh | Explicitly forces a profile to synchronize with a master data record. Any changes to the master record and all updates performed by other users on the master record will be reflected in the profile |
| close | Closes a profile and releases any resources it may have had. |

The entity profile class includes variables, data and methods necessary to define basic functional interfaces of entity profiles. In the specific example of FIG. 5A the entity profile class extends the profile interface (i.e., it supports all the methods found in the profile interface) by providing several methods that are specific to entity profiles. Table 2 summarizes these special methods.

TABLE 2

| Method | Operation Summary |
| --- | --- |
| getEntityID | Returns the entity ID of a specified entity profile. |
| getEntityType | Returns the value of the type attribute of a specified entity profile. |
| getEntityName | Sets the value of the name attribute of a specified entity profile. |
| getEntityName | Returns the value of the name attribute of a specified entity profile. |

The profilelist class includes variables, data and methods necessary to define basic functional interfaces of profilelists. The profilelist class also extends the profile interface and provides additional methods used to look at and manipulate the contents of a profilelist. Table 3 summarizes operation of the components of a Profile list object shown in FIG. 5A.

TABLE 3

| Method | Operation Summary |
| --- | --- |
| getListKey | Returns the key to a list. All members of a list contain an attribute reference by a list key and no two members have the same value assigned to this key. |
| first | Moves the list index to the first member profile in the list |
| last | Moves the list index to the last member profile in the list |
| next | Moves the list index to the next member profile in the list. |
| previous | Moves the list index to the previous member profile in the list. |
| moveTo | Moves the list index to a member profile with a specified key value. |
| list | Returns a list's profiles members. |
| hasMoreElements | Indicates whether a profile list has more elements based on the current position of the list index. |
| size | Returns the number of members currently in the profile list. |
| addMember | Adds a specified profile to the list membership. |
| removeMember | Removes a profile associated with a specified key from the list membership. |
| get | Returns the profile at the current list index. The caller must have read privilege on the profile member. |

The functions described in Tables 1–3 are representative only and it is contemplated that the profile, entity profile, and profilelist classes will implement a variety of other methods to meet the needs of a particular application. The specific methods and interfaces identified herein can be implemented in any available object-oriented programming environment such as, for example, SmallTalk, C++, Java™, and the like. Java is a trademark or registered trademark of Sun Microsystems, Inc. in the United States and other countries.

FIG. 5B shows a profile service class implementing the profile service interface to profile methods for creating and retrieving profiles. Table 4 summarizes important methods implemented in the profile service interface.

TABLE 4

| Method | Operation Summary |
| --- | --- |
| newProfile | Given a set of initializing criteria, the method creates a new profile. |
| newProfileList | Given a set of initializing criteria, the method creates a new profile list. |
| newEntity | Given a set of initializing criteria, the method creates a new entity profile. |
| retrieveProfile | Retrieves a profile with a specified resource ID. |
| removeProfile | Removes an profile with a specified resource ID. If the profile is referenced by other profiles, the removed profile will simply be relocated and assigned a new resource ID. |
| search | Given a search expression the search method returns a list of subprofiles and/or attribute values of a profile that match the given search expression. This method can search all profiles. |

TABLE 4-continued

| Method | Operation Summary |
| --- | --- |
| defineProfileSchema | Creates a template which defines what a profile should look like. |
| removeProfileSchema | Removes a template definition from a profile. |
| defineExternalDataStore | Defines a new external data store for integration into the profile service virtual data store. |
| removeExternalDataStore | Removes a specified external data store definition. |
| listExternalDataStore | Returns a list comprised of all the external data store resource IDs currently defined. |
| newExternalDataStore | Creates a new external data reference object that can be assigned to the value of any attribute. |

Each of the methods summarized in tables 1–4 perform specified data operations (i.e., read, write, modify) including true-data and meta-data manipulations. In the preferred implementation, the manner in which these data operations are performed is determined, in part, by context information supplied by the user. The context information may be used to enable or prevent the data operation altogether. Alternatively, it may modify how the operation is performed (e.g., a get profile may retrieve all attributes for some users and a subset of attributes for other users).

Figures 6A, 6B:
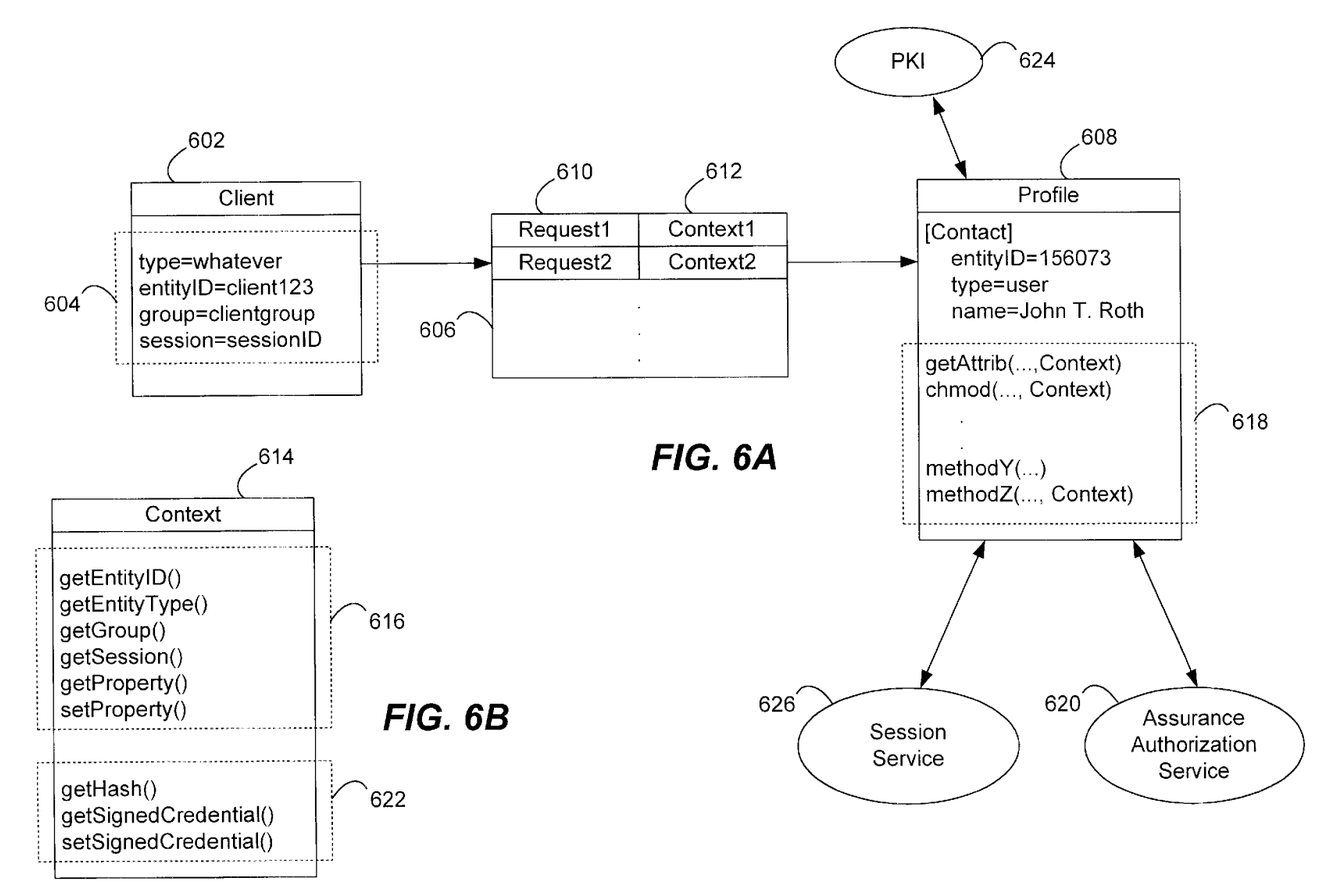
FIG. 6A and FIG. 6B show a context service used to authenticate a client.

FIG. 6A and FIG. 6B show a context service used to authenticate a client 602 as contemplated by the present invention. The client 602 has a set of identifying properties 604 and sends a message or "request packet" 606 to a profile service 608. As used herein, the client 602 may be any entity requiring access to data contained within the profile 608 and may include a user, a software application, or another profile structure. The profile service 608 may be substituted with other profile structures containing or affecting data used by the client 602, such as a profile, a profilelist, a entity profile, or a profileservice object. Furthermore, the present invention may apply generally to a client/server communication session, whereby the profile service 608 represents a general service application running on a server.

The request packet 606 issued by the client 604 can be sent over a internal network, or an open network such as the Internet. In an exemplary embodiment of the invention, the request packet 606 is sent in XML using an HTTP format. Each request packet 606 issued by the client 602 comprises a request 610 and an associated request context 612. For example, Request1 is associated with Context1 and so on. The request context 612 contains information about the client's identity and establishes the client's credentials. It is contemplated that the context 612 may be an object or a reference to an object supporting certain methods.

A context object 614 is shown in FIG. 6B. The context object includes methods 616 for recording the client's identifying properties 604 into the request context 612. In one embodiment of the present invention, the request context 612 contains a concatenated string of the client's identifying properties 604. For example, the context object 614 includes methods for recording the client's entity identification (getEntityID), the client's entity type (getEntityType), the client's group (getGroup), and the current telecommunications session (getSession).

The context object 614 may record other or additional identifying properties about the client not listed above, such as the HTTP client used, the line speed, timestamps, and other environment properties. In addition, not every identifying property requested by the context object 614 need be returned by the client. For example, the client may not know the session ID used. It is contemplated that the context object 614 will simply record unknown properties as unknown (setProperty). Client property information that is of a security nature, such as a client password, is typically not recorded by the context object 614, however it is contemplated that this type of information may also be included in the context. It should also be noted that Context1 and Context2 of FIG. 6A may contain the same or different information, depending on the identifying properties chosen. For example, if a timestamp is included in the request context 612, the context values will change over time.

After the request context 612 is constructed and associated with a request 610, both the request 610 and the context 612 are sent to the profile 608 as clear (unencrypted) text. Profile methods 618, described earlier in Tables 3 to 5, receive the request context 612 and use it to authenticate and authorize the client's requested action. For example, a method such as getAttrib may authenticate the client 604 by checking the client's identifying properties listed in the request context 612 against a known client profile. If the identifying properties do not match the client's profile, the client is not authenticated and the requested action is not carried out.

As mentioned previously, the present invention may optionally support an authorizing service module 620 which returns a client assurance level value. The authorization service 620 examines the recorded context properties 612 received by the profile 608 and returns a floating point assurance value. The assurance value is determined using known algorithms which calculate a trust level from a set of client identification values. The returned assurance level must be equal to, or higher than, a predefined assurance level in order for the client to be authenticated.

Once the client is authenticated, the method next determines if the client 602 is authorized to carry out the requested action. This is typically accomplished by checking the context values 612 against meta-data values within the profile 608. For example, the getAttrib method determines if the client is authorized to read an attribute by checking the client's access privilege for the requested attribute. It is contemplated that some profile methods 618 do not require a context input (e.g. methody). Context input is generally not required for methods which do not return or modify profile data. Furthermore, if no context is received by a method which requires one, a default anonymous context is created. Depending on the privileges associated with the method, the default anonymous context may or may not granted the client 602 access privileges.

By including a context field for profile methods 618, the client 602 is authenticated and authorized every time a profile 608 action is requested. This method of client/server communication is advantageous in preventing an authorized third party from gaining profile service access. A third party attempting to hijack a client/server connection will be unable to gain access to the profile service without knowing the client's identifying properties. Likewise, an intruder trying to gain access using a falsified IP address of a trusted location will still be required to provide the client's identifying properties.

In another embodiment of the present invention, the context object 614 supports client certification methods. The certification methods 622 allow the sender to digitally "sign" the control data, thereby authenticating its origin and content, and increasing the security of the client/server communication. Basically, signing a message is a two step process. First, the message is run through a hashing algorithm which returns a message digest number. A digest number is generally a fixed length number unique to the hashed message. If the message is altered in any way, re-running the hashing function on the altered message returns a different message digest number. Next, the sender encrypts the message digest number with his or her own private key and attaches the encrypted digest number to the end of the message.

The entire message with the encrypted digest number is sent to the recipient. When the recipient receives the message, he or she can check that the message sent is truly from the sender by first decrypting the digest number within the message using the sender's public key. Then, using the same hashing algorithm used by sender, the recipient can verify the message has not been altered by comparing the calculated message digest number with the sender's attached digest number. If the two numbers do not match, the recipient knows the message has been altered or has been sent by someone other than the purported sender.

In the present invention, the credentialing methods 622 are optionally used to create a signed credential after the client's identifying properties 604 are entered into the request context 612. Specifically, a hashing method is used to concatenate the recorded identifying properties 604 into a digest number (getHash). The hashing method may also hash the associated request 610 along with the identifying properties 604 in the digest number. Next, a signed credential is created by encrypting the digest number with the client's private cryptographic key (setSignedCredential). The signed credential is then recorded in the request context 612 (getSignedCredential) along with the other recorded client properties. It must be noted that no changes to the recorded context properties can occur between the time they are recorded until the time a signed credential is generated. A change occurring during this time will result in a signed credential which does not match the recorded context values.

The profile methods 618 authenticate the client by essentially reversing the steps taken in creating the signed credential. First, the digest number recorded in the request context 612 is decrypted using the client's public key. It is contemplated that the profile 608 may refer to a PKI (Public Key Infrastructure) 624 to the look up the client's public key. Next, the request context 612, and the request 610 if it was included in the digest number, is once more hashed with the same hashing algorithm previously used by the context object 614. The resulting new context digest number is compared to the digest number created by the context object 614. If the two digest numbers do not match, authentication of the client has failed and the profile does not carry out the client's request 610. If the digest numbers match, the recorded context properties 604 are checked to further determine the client's identity, as described above.

It is contemplated that property values recorded as unknown by the context object 614 may be added to the request context 612 through an external service. For example, if a session ID was not known by the client 602 and therefore not recorded by the context object 614, a session service 626 may be called by the profile 608. The session service 626 calculates a session number and appends the request context 612 with the calculated session number. The session service 626 may also certify the appended request context with its own signed credential, adding further assurance that the request context received has not been forged or altered.

To further increase the security of the client/sever communication, the request packet 606 may be encrypted using a profile public key. In this manner, third parties are prevented from intercepting and reading the request packet 606 sent by the client 602. The profile can used its private key to decrypt the received request packet 606 before client authentication and authorization is carried out.

The profile object 608 may return data to the client 602 after a command request 610 is executed. It is contemplated that data communicated by the profile object 608 to the client 602 can be signed and/or encrypted as well. For example, the profile object 608 can encrypt a digest number corresponding to the data sent to the client 602, enabling the client 602 verify the data's authenticity. If the profile object 608 additionally encrypts the data message sent to the client 602, third parties are prevented from eavesdropping and reading the data transferred from the profile 608.

It is contemplated that the invention may include an enterprise framework which automatically handles control data and context data processing. In this embodiment, the client and server communicate through the enterprise framework, with user authentication and authorization steps generally transparent to the client and server.

It will be appreciated that the profile service described herein provides generic profiling capability and defines the fundamental behavior, representation, and functional interfaces for profile objects. In addition, data replication between instances of the profile services are integrated. The generic capabilities described herein enable the definition of data structures to occur independently of and after, a core profile is created and defined. This dynamic extensibility yields a product of wide ranging utility.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for communicating control data to a server by a client, the method comprising:
   associating a context object with the control data;
   recording a set of properties identifying the client in said context object;
   creating a request packet from the control data and said context object; and
   transmitting said request packet to the server.

2. The method of claim 1, further comprising:
   hashing said context object to produce a digest number; and
   recording said digest number in said context object.

3. The method of claim 2, further comprising encrypting said digest number with a client private key.

4. The method of claim 1, further comprising:
   hashing the control data to produce a digest number; and
   recording said digest number in said context object.

5. The method of claim 1, further comprising encrypting said request packet with a server public key.

6. The method of claim 1, further comprising:
   generating a communication session identifier in said properties; and
   recording said session in said context object.

7. The method of claim 1, further comprising formatting said request packet as an eXtensible Markup Language (XML).

8. The method of claim 7, further comprising embedding said request packet in a Hyper Text Transport Protocol (HTTP) transport packet.

9. The method of claim 1, further comprising receiving a server response from said server.

10. A method for accessing server resources by a client, the method comprising:
    receiving a client request packet by a server, said client request packet including control data and an associated context object, wherein said context object includes a set of properties identifying the client;
    passing said context object to at least one operation at the server;
    using said context object within said operation; and
    accessing the server resources by said operation.

11. The method of claim 10, wherein said using operation further comprises determining an identity of the client from said context object.

12. The method of claim 11, wherein said determining operation further comprises authenticating said identity of the client.

13. The method of claim 10, wherein said accessing operation is based on said identity of the client.

14. The method of claim 10, wherein said using operation further comprises determining a client privilege from said context object.

15. The method of claim 14, wherein said accessing operation is based on said client privilege.

16. The method of claim 10, further comprising:
    generating a communication session identifier in said properties; and
    recording said session in said context object.

17. The method of claim 10, further comprising generating an assurance level value; and
    wherein said accessing operation is based on said assurance level value.

18. The method of claim 10, further comprising transmitting a server response to said client.

19. A method for accessing server resources by a client communicating control data to a server, the method comprising:
    associating a context object with the control data;
    recording a set of properties identifying the client in said context object;
    creating a request packet from the control data and said context object;
    transmitting said request packet to the server;
    passing said context object to at least one operation at the server;
    using said context object within said operation; and
    accessing the server resources by said operation.

20. The method of claim 19, wherein said using operation further comprises determining an identity of the client from said context object.

21. The method of claim 20, wherein said determining operation further comprises authenticating said identity of the client.

22. The method of claim 20, wherein said accessing operation is based on said identity of the client.

23. The method of claim 19, wherein said using operation further comprises determining a client privilege from said context object.

24. The method of claim 23, wherein said accessing operation is based on said client privilege.

25. The method of claim 19, further comprising:
hashing said context object to produce a digest number; and
recording said digest number in said context object.

26. The method of claim 25, further comprising encrypting said digest number with a client private key.

27. The method of claim 19, further comprising:
hashing the control data to produce a digest number; and
recording said digest number in said context object.

28. The method of claim 19, further comprising encrypting said request packet with a server public key.

29. The method of claim 19, further comprising:
generating a communication session identifier in said properties; and
recording said session in said context object.

30. The method of claim 19, further comprising formatting said request packet as an eXtensible Markup Language (XML).

31. The method of claim 30, further comprising embedding said request packet in a Hyper Text Transport Protocol (HTTP) transport packet.

32. The method of claim 19, further comprising generating an assurance level value; and
wherein said accessing operation is based on said assurance level value.

33. A system for implementing commands over a network, said system comprising:
a server executing a service program;
a client connected to said server over the network;
a request packet issued by said client to said server;
at least one command request within said request packet;
at least one context object associated to said command request within said request packet;
a plurality of methods associated with said service program which perform said command request based on said context object.

34. The system of claim 33, wherein said service program further comprises a plurality of profiles and a profile manager.

35. The system of claim 33, wherein said context object further comprises a plurality of methods to record a set of client identifying properties in said context object.

36. The system of claim 35, wherein said set of client identifying properties further comprises:
a client entity type;
a client entity identification; and
a client group identification.

37. The system of claim 35, wherein said context object further comprises:
a method for creating a digest number by hashing said client identifying properties; and
a method for recording said digest number.

38. The system of claim 37, wherein said context object further comprises a method for encrypting said digest number with a client private key.

39. The system of claim 33, wherein said context object further comprises a method for encrypting said request packet with a server public key.

40. The system of claim 33, wherein said context object further comprises a method for encrypting said command request with a server public key.

41. The system of claim 33, further comprising:
a session service for generating a communication session identifier; and
wherein said context object further comprises a method for recording said communication session identifier in said context object.

42. The system of claim 33, further comprising:
an authorization service for generating an authorization level; and
wherein said methods perform said command request based on said authorization level.

43. The system of claim 33, wherein said request packet is formatted in eXtensible Markup Language (XML).

44. A system for implementing commands over a network, said system comprising:
means for associating a context object with the control data;
means for recording a set of properties identifying the client in said context object;
means for creating a request packet from the control data and said context object;
means for transmitting said request packet to the server;
means for passing said context object to at least one operation at the server;
means for using said context object within said operation; and
means for accessing the server resources by said operation.

45. A computer program product comprising:
a computer usable medium and computer readable code embodied on said computer useable medium for communicating control data to a server by a client, the computer readable code comprising:
computer readable program code configured to cause the computer to effect the associating of a context object with the control data;
computer readable program code configured to cause the computer to effect the recording of a set of properties identifying the client in said context object;
computer readable program code configured to cause the computer to effect the creating of a request packet from the control data and said context object; and
computer readable program code configured to cause the computer to effect the transmitting of said request packet to the server.

46. A computer program product comprising:
computer usable medium and computer readable code embodied on said computer useable medium for accessing server resources by a client, the computer readable code comprising:
computer readable program code configured to cause the computer to effect the receiving of a client request packet by a server, said client request packet including control data and an associated context object, and said context object includes a set of properties identifying the client;
computer readable program code configured to cause the computer to effect the passing of said context object to at least one operation at the server;
computer readable program code configured to cause the computer to effect the using of said context object within said operation; and
computer readable program code configured to cause the computer to effect the accessing of the server resources by said operation.

47. A computer program product comprising:
a computer usable medium and computer readable code embodied on said computer useable medium for accessing server resources by a client communicating control data to a server, the computer readable code comprising:

computer readable program code configured to cause the computer to effect the associating of a context object with the control data;

computer readable program code configured to cause the computer to effect the recording of a set of properties identifying a client in said context object;

computer readable program code configured to cause the computer to effect the creating of a request packet from the control data and said context object;

computer readable program code configured to cause the computer to effect the transmitting of said request packet to the server;

computer readable program code configured to cause the computer to effect the passing of said context object to at least one method at the server;

computer readable program code configured to cause the computer to effect the using of said context object within said method; and computer readable program code configured to cause the computer to effect the accessing of the server resources by said method.

* * * * *